United States Patent Office 3,013,047
Patented Dec. 12, 1961

3,013,047
PHOSPHORUS-CONTAINING DERIVATIVES OF BENZYLMERCAPTAN AND PROCESS FOR THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed Mar. 25, 1960, Ser. No. 17,502
Claims priority, application Germany Mar. 28, 1959
10 Claims. (Cl. 260—461)

The present invention relates to and has as its objects new and useful insecticidal compounds as well as processes for their production. Generally the new compounds of this invention may be represented by the following formula

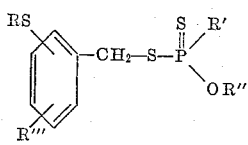

in which R and R' stand for aliphatic or aromatic radicals, R'' stands for an alkyl radical, and R''' stands for a substituent of the benzene nucleus or no further substituent thereof.

A great number of insecticidal derivatives of thiophosphoric acids or thiophosphonic acids is already known from the literature.

This new class of thiophosphonic acid compounds which has been found to be of special value may be obtained by reacting corresponding mercapto-alkyl-substituted benzyl halides with suitable salts of O-alkyl-dithiophosphonic acids. This reaction may be illustrated by the following reaction scheme:

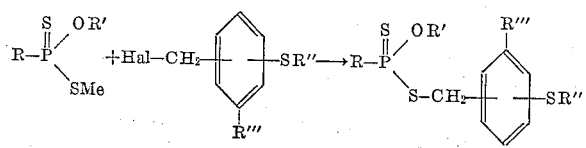

In the above formulae the symbols again have the same significance as given above.

This reaction which may be carried out in a generally known manner is preferably performed in suitable inert organic solvents. Not only alcohols, lower ketones, acetonitrile but also benzene, toluene, xylene and the like have proved to be useful. Potassium or ammonium salt are the preferred salts of dithiophosphonic acids to be used according to the present invention. The reaction is advantageously carried out at slightly elevated temperatures (up to 100° C.).

The new compounds are pest control agents which are distinguished by a good activity against a number of insect pests and by a comparatively low toxicity. Especially notable is the activity of the compounds obtainable according to the invention against phosphorus-resistant kinds of pests. The compounds may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

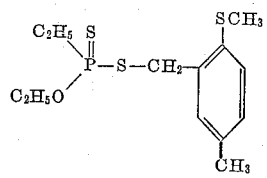

has been tested against flies, aphids and spider mites. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against flies (Musca domestica): About 50 flies are placed under covered petri dishes in which drip wet filter paper has been placed which is sprayed with an insecticidal solution of a concentration as shown below and prepared as stated above. The living status has been determined after 24 hours. The following results have been obtained: Flies were killed completely with solutions of 0.1% and 0.01%;

(b) Against aphids (species Doralis fabae): Heavily infested bean plants (Vitia faba) have been sprayed drip wet with solutions as prepared above in a concentration as shown below. The effect has been determined by evaluation after 24 hours by counting the dead pests either on the surface of the soil or still remaining on the plants. The following results have been obtained: Complete killing has been obtained with 0.001% solutions.

(c) Against spider mites (contact-insecticidal action): Bean plants (Phaseolus vulgaris) of about 15 inches height were sprayed drip wet with solutions as prepared above in a concentration as shown below. The bean plants have been infested heavily with the two-spotted spider (species Tetranychus telarius). Evaluation has been carried out after 24 hours, 48 hours and 8 days. The following results have been obtained: Spider mites were killed completely with 0.001% solutions.

The following examples are given for the purpose of illustrating the process according to the invention.

*Example 1*

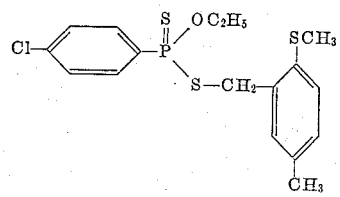

73 grams (0.25 mol) of p-chlorophenyl-O-ethyl ester-thiono-thiolphosphonic acid potassium salt are dissolved in 150 cc. of methyl ethyl ketone. 47 grams of 2-chloromethyl-4-methyl-thioanisole are added at 80° C. with stirring. The mixture is kept at 80° C. for one hour, then cooled to room temperature and the reaction product poured into 400 cc. of ice-water. The separated oil is taken up into 400 cc. of benzene, repeatedly washed with water and subsequently dried with sodium sulfate. When distilling off the solvent, a pale yellow, water-insoluble oil remains. This is briefly kept at 80° C. under a pressure of 0.01 mm. Hg. 79 grams of the new ester are thus obtained. Yield 78% of the theoretical. On rats per os the toxicity is 250 mg./kg. LD$_{50}$.

By strictly the same way there may pe obtained the following compounds, when using the corresponding analogous starting materials:

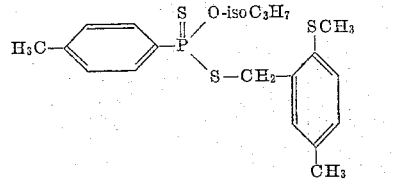

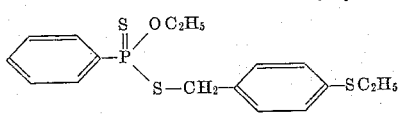

*Example 2*

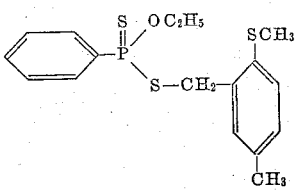

64 grams (0.25 mol) of phenyl-O-ethyl ester-thionothiolphosphonic acid potassium salt are dissolved in 150 cc. of acetonitrile. 47 grams of 2-chloromethyl-4-methyl-thioanisole are added at 80° C. with stirring. The mixture is kept at 80° C. for one hour and is then allowed to cool. The reaction product is poured into 300 cc. of ice water. The separated oil is taken up in 400 cc. of benzene. The benzene solution is washed neutral with water and subsequently dried. After removal of the solvent, an oil remains which is briefly heated to 80° C. under a pressure of 0.01 mm. Hg. 66 grams of the new ester are thus obtained in the form of a pale yellow, water-insoluble oil. Yield 72% of the theoretical. On rats per os LD$_{50}$ toxicity 250 mg./kg.

*Example 3*

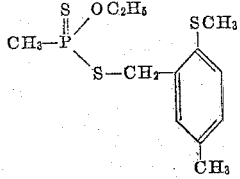

49 grams (0.25 mol) of methyl-O-ethyl ester-thionothiolphosphonic acid potassium salt are dissolved in 150 cc. of acetonitrile. 47 grams of 2-chloromethyl-4-methylthioanisole are added at 70° C. with stirring. The mixture is kept at 70° C. for one hour and the reaction product then is poured into 300 cc. of ice water. The separated oil is taken up in 300 cc. of benzene, washed neutral with water and subsequently dried with sodium sulfate. After distilling off the solvent a pale yellow oil remains which is briefly kept under a vacuum of 0.01 mm. Hg. at a bath temperature of 70° C. 60 grams of the new ester are thus obtained in the form of a pale yellow, water-insoluble oil. Yield 78% of the theoretical. On rats per os the new ester has a toxicity of 5 mg./kg. LD$_{50}$.

By exactly the same way and using the corresponding starting materials there may be obtained the following compound

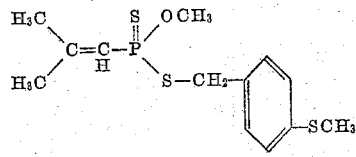

*Example 4*

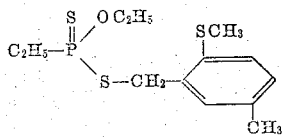

52 grams (0.25 mol) of ethyl-O-ethyl ester-thionothiolphosphonic acid potassium salt are dissolved in 150 cc. of acetonitrile. 47 grams of 2-chloromethyl-4-methylthioanisole are added at 60° C. with stirring. The mixture is kept at 60° C. for one hour and the reaction product is then poured into 300 cc. of ice water. The separated oil is taken up in 300 cc. of benzene, washed neutral with water and dried with sodium sulfate. After distillation of the solvent, an oil remains which is briefly heated to 60° C. under a pressure of 1 mm. Hg. 74 grams of the new ester are thus obtained in the form of a water-insoluble yellow oil. Yield 93% of the theoretical.

*Example 5*

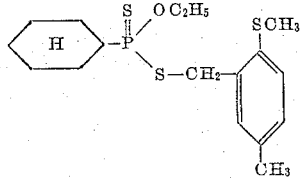

66 grams (0.25 mol) of cyclohexyl-O-ethyl ester-thionothiolphosphonic acid potassium salt are dissolved in 150 cc. of acetonitrile. 47 grams of 2-chloromethyl-4-methylthioanisole are added at 80° C. with stirring. The mixture is kept at 80° C. for one hour and the reaction product is then poured into 400 cc. of ice water. The separated oil is taken up in 400 cc. of benzene, washed neutral with water and subsequently dried with sodium sulfate. After distillation of the solvent, an oil is obtained which is briefly kept at 70° C. under a pressure of 0.01 mm. Hg. 83 grams of the new ester are thus obtained in the form of a pale yellow, water-insoluble oil. Yield 89% of the theoretical.

By strictly the same manner and using the corresponding starting materials there may be obtained the following compound

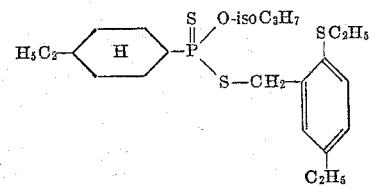

I claim:
1. A phosphorus-containing derivative of benzyl-mercaptan of the following formula

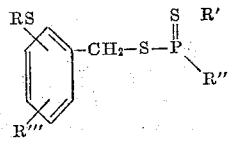

in which R stands for a lower alkyl radical having up to 8 carbon atoms, R' stands for a lower alkoxy radical having up to 4 carbon atoms, R'' stands for a member selected from the group consisting of phenyl radicals, lower alkyl radicals having up to 4 carbon atoms, lower alkenyl radicals having up to 4 carbon atoms, cyclohexyl and lower alkyl-substituted cyclohexyl and R''' stands for a member selected from the group consisting of hydrogen and lower alkyl radicals having up to 4 carbon atoms.

2. The compound of the following formula

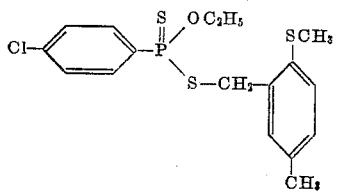

3. The compound of the following formula

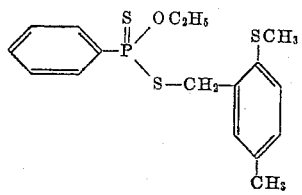

4. The compound of the following formula

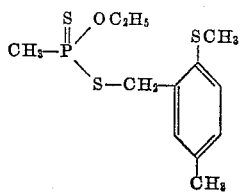

5. The compound of the following formula

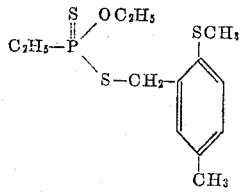

6. The compound of the following formula

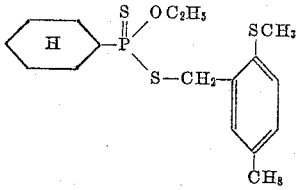

7. A phosphorus-containing derivative of claim 1 wherein R'' is a phenyl radical.

8. A phosphorus-containing derivative of claim 1 wherein R'' is a lower alkyl radical having up to 4 carbon atoms.

9. A phosphorus-containing derivative of claim 1 wherein R'' is a lower alkenyl radical having up to 4 carbon atoms.

10. A phosphorus-containing derivative of claim 1 wherein R'' is a lower alkyl-substituted cyclohexyl radical.

No references cited.